W. B. GAGE.
LUBRICATOR.
APPLICATION FILED JULY 28, 1910.

1,224,919.

Patented May 8, 1917.

WITNESSES
G. M. Spring
L. E. Barkley

INVENTOR
William B. Gage
by Frank Launerman
ATTORNEY

UNITED STATES PATENT OFFICE.

WILLIAM B. GAGE, OF WHITEWATER, WISCONSIN.

LUBRICATOR.

1,224,919.     Specification of Letters Patent.     Patented May 8, 1917.

Application filed July 28, 1910. Serial No. 574,333.

*To all whom it may concern:*

Be it known that I, WILLIAM B. GAGE, a citizen of the United States of America, and resident of Whitewater, in the county of Walworth and State of Wisconsin, have invented certain new and useful Improvements in Lubricators, of which the following is a specification.

This invention relates to lubrication and particularly to an apparatus designed for the purpose of delivering lubricant by what is known as the force feed system.

An object of this invention is to provide novel means for utilizing the power of an engine or motor for driving the feeding mechanism, the apparatus being capable of being timed for the purpose of increasing or diminishing the amount of lubricant forced by it in a given cycle of operation of the engine or motor.

A further object of this invention is to provide novel means for reciprocating a piston by a step by step movement and further to produce a lubricant feeding mechanism which will operate in conjunction with lubricating materials of different densities and in different states of refinement, it having been found that relatively coarse materials may be fed by the lubricating apparatus although it has also been found that it will work successfully with the more refined materials.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
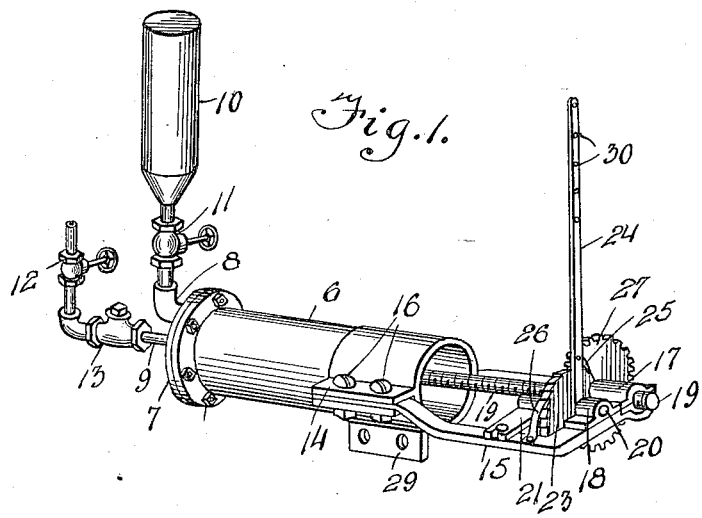
Figure 1 illustrates a view in perspective of a lubricant feeding apparatus embodying the invention.
Figure 2:
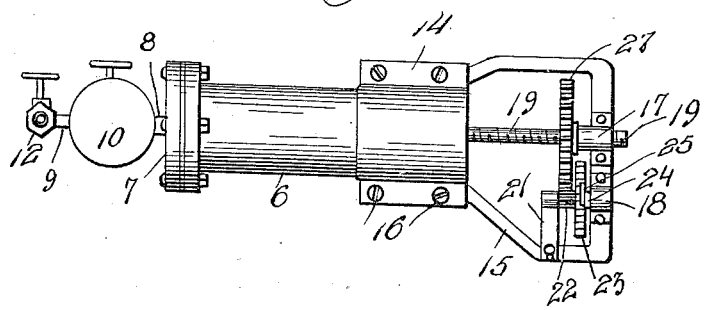
Fig. 2 illustrates a top plan view thereof.
Figure 3:
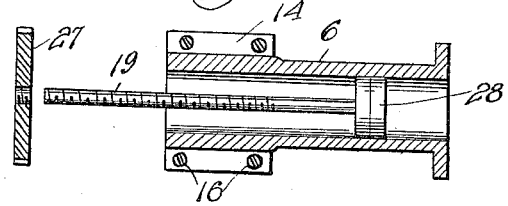
Fig. 3 illustrates a detail sectional view of the cylinder with a piston applied thereto.

In these drawings 6 denotes the cylinder having a head 7 containing openings for the pipes 8 and 9, the former of which is connected to a tank, reservoir or the like 10 which is designed to contain a supply of lubricating material. A valve 11 is interposed between the tank 10 and the cylinder for the purpose of regulating the supply of lubricant.

The pipe 9 is the discharge pipe and is to be in communication with the member to receive the lubricant as for instance the cylinder of an engine or the like. The pipe 9 is provided with a valve 12 and a check valve 13.

The cylinder is provided with flanges 14, 14 to which the ends of a bracket 15 is secured through the medium of the bolts 16. The bracket 15 contains two journal bearings 17 and 18, the former of which contains the threaded piston rod 19. The journal bearing 18 contains a short shaft 20 which shaft is also journaled in the end of an arm 21, and the said shaft contains a pinion 22 and a ratchet wheel 23. A lever 24 is pivoted on the shaft 20 and has a pawl 25 which engages the teeth of the ratchet wheel as the lever is oscillated through its being connected to the motor, engine or other driving mechanism. The ratchet wheel 23 is also engaged by a detent 26 which prevents retrograde movement of the said ratchet wheel during the time the said pawl is being carried rearwardly over the surfaces of the ratchet teeth during the oscillation of the lever.

The pinion 22 meshes with a gear wheel 27 which is threaded on the piston rod 19 and hence as the gear wheel 27 is rotated, the piston rod is moved transversely of the said gear wheel, thereby giving a step by step movement to the piston 28 which travels in the cylinder and is of course connected to the piston rod.

The cylinder 6 is further provided with a lug 29 by which it is fastened to a bed plate frame or other part of the machinery for the purpose of holding it in operative relation to the lever oscillating mechanism.

From an inspection of the drawing, it will be apparent that the throw of the lever may be adjusted by reason of the fact that the said lever is provided with a series of apertures 30 to which the driving mechanism may be coupled and that owing to the fact that the said lever is oscillated, the pawl will cause the step by step rotation of the ratchet wheel and the said ratchet wheel will, in turn, through the pinion 22 and the gear wheel 27, communicate motion to the piston rod and thus move the piston in the cylinder and force from the cylinder the lubricant contained therein in a step by step movement.

I have found that by gearing the engine or motor for operating the lubricator, I can cause the fly wheel of the engine to revolve twenty-five times while the gear wheel 27 is moved the distance of one tooth and that at each movement of the wheel 27, the distance of one tooth, a drop of lubricant is forced from the cylinder. While this arrangement will be satisfactory in certain types of engines, it may be necessary to so gear the lubricator with respect to the engine that a greater or less amount of lubricant will be forced therefrom.

I claim—

A forced feed lubricating device comprising a cylinder having openings in one end thereof, a pipe extending into one of the openings, a reservoir in communication with said pipe for supplying said cylinder with a lubricant, a discharge pipe extending from the other opening and being in communication with the interior of the cylinder, a valve for controlling the passage of material through said pipe, a frame comprising arms and clamping elements, the clamping elements adapted to embrace the opposite end of the cylinder, a threaded rod extending into the cylinder and having a piston on one end thereof, means supported by the arms and engaging the threaded rod of the piston for moving the piston longitudinally of the cylinder for forcing material therefrom, said means comprising a ratchet gear, a lever having one end pivotally mounted in a bearing and carrying a pawl to engage the ratchet member, the upper end of the said lever having a plurality of openings to receive a connecting arm, said pawl adapted to engage ratchet teeth of the ratchet, and means for causing the piston to move longitudinally of the piston.

In testimony whereof, I affix my signature in the presence of two witnesses.

WILLIAM B. GAGE.

Witnesses:
 JAS. G. KESTOL,
 EARL ROGERS.

Copies of this patent may be obtained for five cents each, by addressing the "Commissioner of Patents, Washington, D. C."